Feb. 28, 1967  E. J. TASCHENBERG  3,306,620
THERMALLY STABLE LIP SEAL
Filed April 16, 1964  2 Sheets-Sheet 1

INVENTOR.
ERNEST J. TASCHENBERG
BY
Oscar B Brumback
his
ATTORNEY.

INVENTOR.
ERNEST J. TASCHENBERG
BY Oscar B Brumback
his ATTORNEY

United States Patent Office 3,306,620
Patented Feb. 28, 1967

3,306,620
THERMALLY STABLE LIP SEAL
Ernest J. Taschenberg, Baltimore, Md., assignor to Koppers Company, Inc., a corporation of Delaware
Filed Apr. 16, 1964, Ser. No. 360,337
9 Claims. (Cl. 277—26)

This invention relates generally to a fluid seal for rotating shafts and more particularly to a fluid seal wherein a uniform axial force is exerted on a surface of the seal when there is axial eccentricity between the rotating shaft and a portion of the seal.

One of the principal difficulties encountered in providing a fluid seal between a fixed housing and a rotating shaft is to maintain a uniform axial sealing force on the fluid seal when the rotating shaft is axially displaced relative to a fixed housing so that there is an axial eccentricity between the rotating shaft and the fluid seal. With known fluid seals the amount of axial eccentricity between the rotating shaft and the seal is limited by the flexibility of the sealing member and the ability of the seal to maintain a uniform sealing force against a portion of the fixed housing. It is highly desirable to provide a seal that permits substantial axial eccentricity between the shaft and the fixed housing and yet maintains a fluid seal between the rotating shaft and the fixed housing.

Another important property of a fluid seal is to provide a seal that has dimensional stability under high operating temperatures. The dimensional stability improves the sealing characteristics of the fluid seal.

The fluid seal herein disclosed is an improvement over the seal described in United States Patent 2,998,987, entitled "Teflon Lip Seal," and assigned to the assignee of the present invention.

The fluid seal disclosed in United States Patent 2,998,987 includes an annular seal ring that has an axially projecting annular lip portion and a radially extending flange portion adjacent one end of the annular lip portion. The annular lip portion has a first right circular conical exterior surface and a second right circular conical exterior surface. The central cone angles of the conical surfaces are such that a ring member positioned in overlying relation with both surfaces exerts an axial loading on one of the conical surfaces and a radial loading on the other conical surface. The annular ring member, therefore, biases the sealing surfaces of the annular seal ring in both an axial and radial direction. The radial biasing force urges the annular lip portion into sealing engagement with the rotating shaft. The axial loading urges the seal ring radial flange portion into sealing engagement with the seal housing. With this arrangement the annular seal ring provides an effective seal along two surfaces to thereby prevent passage of fluid therearound.

Although the seal described in the United States Patent 2,998,987 provides an effective seal, it has been discovered by the improvements herein disclosed that it is now possible to provide a seal that has greater dimensional stability at high operating temperatures and maintains uniform axial loading under substantial axial eccentricity between the rotating shaft and the fixed housing.

Briefly, the invention herein disclosed is directed to a fluid seal that includes within an annular housing an annular seal ring that has an axially extending annular lip portion and a radially extending flange portion. The annular lip portion has a cylindrical exterior surface adjacent the radially extending flange portion.

An annular support ring is positioned adjacent the radially extending flange portion and in overlying relation with the cylindrical exterior surface. An annular wedge ring is positioned in overlying relation with the forward portion of the seal ring annular lip and includes resilient means to urge the seal ring annular lip portion radially inwardly in sealing relation with the rotating shaft. A resilient means is positioned between the wedge ring and the annular support ring to urge the support ring and the seal ring radially extending flanged portion axially to thereby maintain a sealing relation between the seal ring radially extending flange and an annular planar surface of the seal housing.

With this arrangement the annular support ring serves a dual function in that it provides stability to the annular seal ring under high operating temperatures and provides rigidity for the radially extending annular flange. In conjunction with the resilient means between the wedge ring and the annular support ring, the annular support ring maintains the seal ring radial flange portion in uniform sealing engagement with the radially extending planar surface of the seal housing under conditions of substantial axial eccentricity between the rotating shaft and the fixed housing.

In another embodiment of this invention there is illustrated a fluid seal that includes within the annular seal housing an annular seal ring with an axially extending annular lip portion and a radially extending lip portion. The annular lip portion is maintained in sealing relation with the rotating shaft by an annular wedge ring and the radially extending lip portion is maintained in sealing relation with a radial planar surface of the seal housing by an annular resilient means urging the annular support ring axially against a portion of the radially extending lip portion. The rear surface of the radially extending lip portion may also be subjected to fluid pressure to further urge the radially extending lip portion into sealing engagement with the radial planar surface of the seal housing.

Accordingly, an object of this invention is to provide a fluid seal for a rotating shaft which remains in sealing relation with the rotating shaft when there is axial eccentricity between the rotating shaft and the fixed housing.

Another object of this invention is to provide a seal for a rotating shaft that is dimensionally stable and provides improved sealing characteristics at high operating temperatures.

A still further object of this invention is to provide a seal for a rotary shaft that includes means to uniformly urge a portion of the seal axially and provide a uniform axial loading around a radial planar surface of the seal when there is axial eccentricity between the shaft and the fixed housing.

These and other objectives of this invention will appear more fully from the following detailed description when read in connection with the accompanying drawings. It is to be expressly understood, however, that the drawings are not intended as a definition of the invention but are for the purpose of illustration only.

Figures 1, 2, 3:
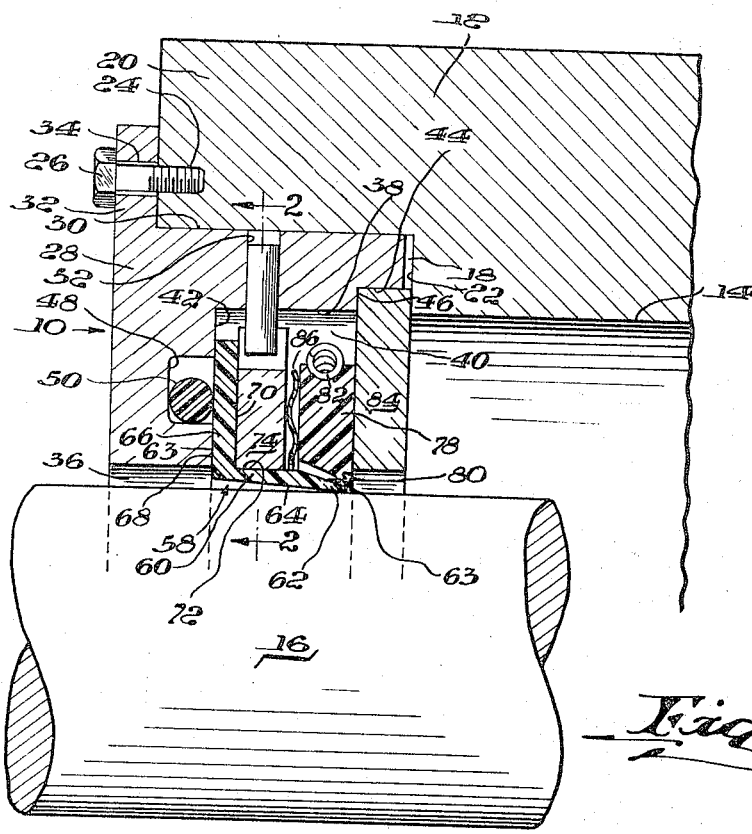
FIGURE 1 is an axial sectional view of the fluid seal and a rotating shaft extending axially therethrough.
FIGURE 2 is a view in section taken along the lines 2—2 of FIGURE 1.
FIGURE 3 is a perspective view of the corrugated resilient washer positioned between the annular support ring and the wedge ring.

Referring to FIGURE 1 of the drawings, the seal generally designated by the numeral 10 is illustrated as being secured to a fixed housing 12 having a cylindrical opening 14 therethrough. Extending through the opening 14 is a rotating shaft 16. The fluid seal 10 is arranged to provide a seal between the external surface of shaft 16 and the internal surface of the opening 14 in fixed housing 12. The opening 14 in housing 12 has an enlarged annular recess 18 adjacent the housing end portion 20. The recess 18 forms an inwardly extending annular shoulder 22 adjacent the cylindrical opening 14. The housing end portion 20 has a plurality of threaded apertures 24 to receive bolts 26 that secure the seal 10 thereto, as later explained.

The fluid seal 10 has an annular ring-like housing 28 which has an external cylindrical surface 30 substantially the same diameter as the housing annular recess 18 and a radial flange portion 32 which abuts the housing end portion 20. The radially extending flange portion 32 has a plurality of apertures 34 through which bolts 26 extend to secure the seal housing 28 to the fixed housing 12. The housing 28 has a central aperture 36 therethrough having a diameter slightly larger than the diameter of rotating shaft 16 and has an annular recessed portion 38 in which there are positioned the other portions of the seal.

The recessed portion 38 has a cylindrical internal surface 40 with a radially inwardly extending planar surface 42. The recessed portion internal cylindrical surface 40 has an annular recessed portion 44 with an inturned shoulder 46. Thus, the internal recessed portion 40 has a first radial inwardly extending planar surface 42 and an enlarged recess 44 with an inturned shoulder portion 46. The planar surface 42 has an annular groove 48 formed therein to receive an O-ring 50. The housing 28 has a radially extending cylindrical passageway 52 in which there is positioned a cylindrical pin 54 that has an end portion 56 extending into the recessed portion 38 (FIGURE 2).

There is positioned within the housing recessed portion an annular seal ring generally designated by the numeral 58 that is fabricated from a flexible material such as glass filled Teflon or the like. The seal ring 58 has an axially extending portion 60 that terminates in an annular lip portion 62. Internal surface 64 of lip portion 62 deviates from a cylindrical surface by an angular deviation of about 3°, as is illustrated in FIGURE 1. The lip portion external surface 63 is conical in shape and has a slope of about 15°. A flange portion 66 having a radially extending external planar surface 68 and a radially extending internal planar surface 70 extends radially from the annular seal ring 58. Adjacent the radial flange 66 the annular seal ring axially extending portion 60 has a cylindrical external surface 72. With this construction the radial flange inner surface 70 and the cylindrical external surface 72 intersect at substantially right angles.

An annular support ring 74 is positioned in overlying relation with the seal ring cylindrical external surface 72 and abuts the seal ring flange internal surface 70. Suitable means are provided to bond the annular support ring 74 to the seal ring cylindrical external surface 72 and the radial flange 66. The annular support ring 74 is preferably rigid and fabricated from a suitable metallic stock. The annular support ring 74 has an axial slotted portion 76 adjacent its external surface. The pin 54 that depends downwardly from the passageway 52 of housing 28 extends into the annular support ring slotted portion 56. The pin permits axial movement of the annular support ring 74 and nonrotatably connects the support ring 74 to the seal housing 28.

A split ring annular wedge member 78, preferably formed of glass filled Teflon or the like, is positioned around the seal ring lip portion 62 and has a depending portion 80 arranged to abut the seal ring lip portion 62 and urge the seal ring lip portion 62 into sealing engagement with the external surface of rotating shaft 16. An annular spring 82 is positioned around the split ring wedge member 78 and urges the ring member 78 radially inwardly to provide the effective seal of seal ring lip 62 against the surface of shaft 16.

An annular back-up plate 84 is positioned in abutting relation with a surface of the wedge ring 78 and abuts the seal housing inturned shoulder 46. The other surface of back-up ring 84 abuts the inturned shoulder 22 of housing 12 so that the seal housing 28 and back-up plate 84 are maintained in relative fixed relation to each other by means of bolts 26 securing the seal housing 28 to the housing 12. It should be understood, however, other means may be employed to secure the seal 10 to a relatively fixed housing and to maintain the back-up plate 84 in fixed relation to the seal housing 28.

An annular corrugated spring 86 is positioned between the split ring wedge member 78 and the annular support ring 74. The annular corrugated spring 86 urges the wedge ring 78 toward the back-up plate 84 and the support ring 74 toward seal housing recessed internal surface 42. The axial urging of the annular support ring 74 by the corrugated spring 86 provides a uniform axial force on the annular seal ring radial flange 66 so that there is a uniform sealing force exerted by the flange surface 68 on the housing surface 42. The slotted portion 76 in support ring 74 permits axial movement of the support ring relative to the housing 28 so that the pressure exerted by corrugated spring 86 is transmitted through the support ring 74 to the seal ring annular flange 66.

The seal 10 has improved dimensional stability at high temperatures in that the heat is transferred through the seal ring 58 to the annular support ring 74. Since the preferred material from which the seal ring 58 is fabricated is Teflon, which has a very high thermal coefficient of expansion when compared with metal, it is highly desirable to provide dimensional stability for the seal ring at high temperatures. The annular support ring 74, which is fabricated of a suitable material having a much lower thermal coefficient of expansion than Teflon, provides the desired dimensional stability for the seal 10. As described, the annular support ring 74 is suitably bonded to the adjacent surface of the annular seal ring 58 to further supply dimensional stability to the annular seal ring 58 under high operating temperatures.

The annular corrugated spring 86 and the support ring 74 provide a means to apply uniform sealing force on the radial flange of the seal ring 58. The axial force exerted by the corrugated spring 86 is transferred through the annular support ring 74 to the annular seal ring flange 66. The annular support ring 74 transmits this axial loading uniformly to the entire surface 68 of seal ring radial flange 66. Thus, when there is an axial deflection of shaft 16, the sealing engagment of seal ring radial flange 66 to the inner surface 42 of housing 28 remains uniform because the axial loading provided by the corrugated spring 86 is not dependent on the axial or radial loads on the wedge ring 78. The annular corrugated spring 86 exerts an axial loading equally around the annular seal ring 58 regardless of axial eccentricity of shaft 16.

Figures 4, 5:
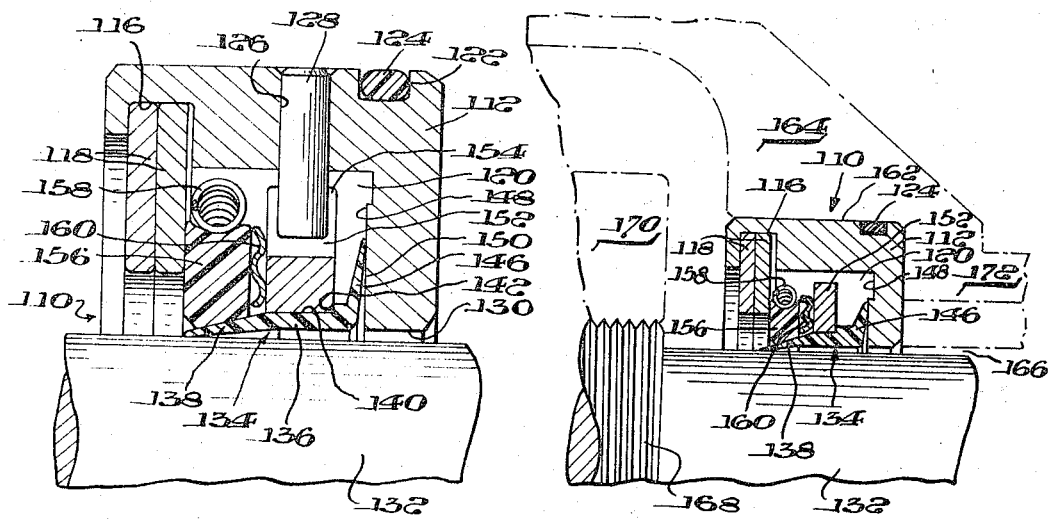
FIGURE 4 is an enlarged axial sectional view similar to FIGURE 1 of another embodiment of the invention illustrating the fluid seal and a rotating shaft extending therethrough.
FIGURE 5 is a view similar to FIGURE 4 illustrating the fluid seal assembly positioned between a pair of rotating members.
Figure 6:
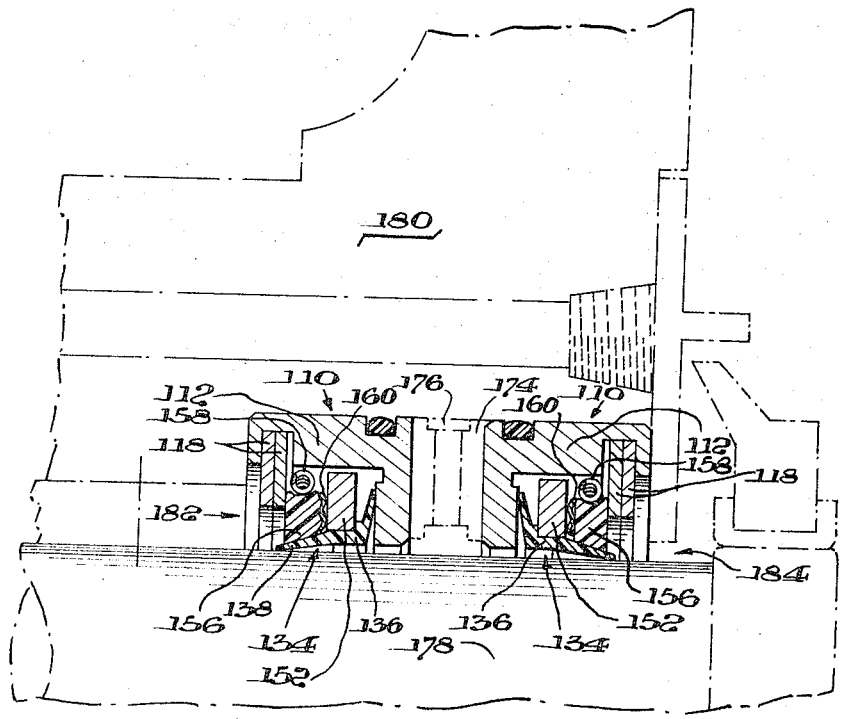
FIGURE 6 is a view similar to FIGURE 5 illustrating a pair of fluid seals maintained in spaced relation to each other and positioned between a pair of rotating members.

Referring to FIGURES 4–6 a second embodiment of a fluid seal built in accordance with the principles of the present invention is illustrated. The seal is generally designated by the numeral 110 and has an annular housing 112 with a radially inwardly extending flange portion 116. The housing 112 has an internal recessed portion 116 arranged to receive a pair of split rings 118 that maintain the flexible components of the seal within the internal cavity 120 of seal housing 112. The annular seal housing 112 has an external recessed portion 122 in which there is positioned an O-ring 124. The housing 112 has a radially extending passageway 126 in which there is fixedly positioned a pin 128. The annular housing 112 has a circular central opening 130 through which a shaft 132 extends.

Positioned within the seal cavity 120 there is an annular seal ring generally designated by the numeral 134 which is fabricated from a flexible material such as glass filled Teflon or the like. The seal ring 134 has an annular body portion 136 which extends axially relative to shaft 132 and a forwardly extending annular lip portion 138. The lip portion 138 converges toward the shaft 132 to provide a fluid seal between the shaft 132 and the seal ring 134. The seal ring body portion 136 has a cylindrical external surface 140 and a radially extending shoulder portion 142. Adjacent the shoulder portion 142 there is a lip portion 146 that extends radially from the body portion 136. The seal housing inwardly extending flange portion 114 has an internal radial planar surface 148. The seal radial lip 146 has a planar surface 150 that abuts the seal housing radial planar surface 148 and provides a fluid seal therebetween. With this arrangement a fluid seal is provided between the rotating shaft 132 and the seal ring 134 by the seal ring annular lip portion 138 and a second fluid seal is provided between the seal housing 112 and the seal ring 134 by the seal ring radially extending lip 146 abutting the housing internal surface 148.

An annular support ring 152 is positioned in overlying relation with the seal ring cylindrical external surface 140 and abuts the annular shoulder portion 142. The support ring 152 may be suitably bonded to the seal ring external surface 140 and the radial shoulder 142. The support ring 152 is preferably rigid and has an axial slot 154 adjacent its external surface. The pin 128 extending through the passageway 126 in the seal housing 112 maintains the ring 152 in nonrotatable relation relative to the seal housing 112 and permits axial movement of the support ring 152 within the seal housing cavity 120.

A split ring annular wedge member 156 is positioned around the seal ring 134 adjacent the annular lip portion 138 and is preferably formed of a flexible material such as glass filled Teflon or the like. An annular resilient spring 158 is positioned around the wedge member 156 and urges the wedge member radially inwardly to thereby urge the ring seal lip portion 138 against the shaft 132 to provide an effective seal therebetween.

An annular corrugated spring 160 is positioned between the split ring wedge member 156 and the annular support ring 152 and is arranged to urge the seal ring annular radially extending lip 146 against the fixed housing internal surface 148 and to urge the wedge ring 156 against the rigid split rings 118. The corrugated spring 160 thus provides a uniform axial force on the seal ring shoulder 142 through which there is a uniform sealing force exerted on the radially extending lip 146 against a planar surface of the housing 112.

The seal 110 may be assembled by positioning the seal ring 134 within the fixed housing cavity 120 with the support ring 152 secured thereto. The pin 128 is positioned in seal housing passageway 126 and extends into the support ring slotted portion 154. The corrugated spring 160 is positioned adjacent the support ring 152, and the wedge ring 156 and spring 158 are positioned adjacent the spring 160. The split ring backup members 118 are then positioned in the seal housing annular recessed portions 116 to provide a unitary seal assembly.

The seal housing 112 is positioned in an annular recess 162 of a case or housing 164 illustrated by dash dot lines in FIGURE 5 with the shaft 132 extending through an aperture 166 in case 164. Suitable support or spacer means for bearings or the like, such as the threaded portion 168, may be provided on shaft 132. When the fluid pressure on the bearing side of the case 164, as indicated by the numeral 170, is greater than the fluid pressure on the opposite side of the seal 110, indicated by the numeral 172 in FIGURE 5, the fluid pressure provides further sealing pressure on the seal ring 134. The fluid pressure urges the annular seal lip portion 138 against the shaft 132 and urges the seal ring radial lip 146 against the seal housing internal surface 148 to provide an effective seal therebetween. The seal housing 112 is maintained in nonrotatable relation to the case 164 and the O-ring 124 provides a static seal between the seal housing 112 and the case 164.

In certain installations where a dual seal is desired, a pair of seals 110 may be positioned in face to face relation with each other, as is illustrated in FIGURE 6. A suitable spacer means 174 maintains the seals 110 in spaced relation to each other and is preferably provided with a radially extending passageway 176 that is open to the atmosphere. With this arrangement fluid pressure greater than atmospheric pressure on opposite axial sides of the pair of seals 110 provides further sealing pressure on the fluid seal annular portions 138 and 146. For example, as is illustrated in FIGURE 6, an effective seal is provided between the rotating shaft 178 and the case 180 where fluid pressure at locations indicated by the numerals 182 and 184 and the arrows associated therewith is greater than pressure of the surrounding atmosphere.

According to the provisions of the patent statutes, the principle, preferred construction and mode of operation of the invention have been explained and what is considered to represent its best embodiments have been illustrated and described. However, it should be understood that within the scope of the appended claims, the invention may be practiced otherwise than as specifically illustrated and described.

I claim:

1. A fluid seal assembly adapted to provide a seal between a pair of relatively rotatable parts comprising, an annular seal housing having an annular recessed portion with a radially extending planar surface, an annular seal ring secured against rotation within said housing annular recessed portion and having an axially extending seal lip portion with a conically shaped external surface adjacent one end, a radially extending portion adjacent the other end portion, a cylindrical external surface between said radially extending portion and said axially extending seal lip portion, said annular seal ring radially extending portion positioned in sealing relation with said seal housing planar surface, an annular support ring having a lower coefficient of thermal expansion than said annular seal ring positioned in overlying relation with said seal ring cylindrical external surface for limiting thermal expansion of said annular ring.

an annular wedge ring positioned in overlying relation with said seal lip portion, means urging said wedge ring radially against said seal ring external conical surface to thereby urge said lip portion into sealing engagement with a cylindrical shaft extending therethrough, and means uniformly urging said support ring axially to thereby maintain said seal ring radially extending portion in non-rotatable sealing engagement with said housing planar surface.

2. In a fluid assembly as set forth in claim 1 in which said annular support ring is rigid and has a pair of planar radial surfaces and an inner cylindrical surface, means securing said annular support ring radial surface to said seal ring radially extending portion and said annular support ring cylindrical inner surface to said annular seal ring cylindrical external surface.

3. A fluid seal assembly as set forth in claim 1 in which said means urging said support ring axially includes an annular resilient corrugated ring member having radial surfaces in different radial planes, said corrugated ring member positioned between said annular support ring and said wedge ring.

4. A fluid seal assembly adapted to provide a seal between a pair of relatively rotatable parts comprising, an annular seal housing having an annular recessed portion with a radially inwardly extending planar surface and an annular shoulder portion spaced from said planar surface, an annular seal ring secured against rotation within said housing annular recessed portion and having
- an axially extending annular seal lip portion with a conically shaped external surface adjacent one end, a radially extending portion adjacent the other end,
- a cylindrical external surface between said radially extending portion and said axially extending annular seal lip portion, said annular seal ring radially extending portion positioned in sealing relation with said seal housing inwardly extending planar surface, a rigid annular support ring having a lower coefficient of thermal expansion than said annular seal ring positioned in overlying relation with said seal ring cylindrical external surface, said support ring having planar radial surfaces and a cylindrical inner surface for limiting thermal expansion of said seal ring cylindrical external surface and rigidly supporting said seal ring radially extending portion, an annular wedge ring positioned in overlying relation with said seal lip portion, an annular resilient member surrounding said annular wedge ring and radially urging said wedge ring against said seal ring external conical surface to thereby urge said annular lip portion into sealing engagement with a cylindrical shaft extending therethrough, an annular back-up plate positioned within said housing and abutting said housing shoulder portion, and annular resilient means positioned between said wedge ring and said annular support ring to urge said seal ring radially extending portion against said seal housing radially extending planar surface to thereby maintain said seal ring portion in non-rotatable sealing engagement with said housing planar surface upon radial eccentricity of said shaft relative to said seal housing.

5. A fluid seal assembly as set forth in claim 4 in which said housing includes a radial passageway adjacent said radially inwardly extending planar surface,
- said support ring including an axial slot adjacent said support ring external surface, and
- a cylindrical pin member positioned in said housing radial passageway and in said support ring slotted portion, said pin member arranged to permit axial movement of said support ring and to nonrotatably secure said support ring to said housing.

6. A fluid seal assembly as set forth in claim 4 in which said seal housing inwardly extending planar surface has an annular recessed portion therein,
- said seal ring radially extending portion having an annular flange portion extending radially beyond said seal housing annular recessed portion, and
- an O-ring positioned in said annular recessed portion and arranged to provide a static seal between said seal housing and said annular seal ring radially extending portion.

7. A fluid seal assembly as set forth in claim 4 in which said annular seal ring radially extending portion includes an annular radial lip portion,
- said radially extending lip potrion positioned in non-rotatable sealing relation with said seal housing inwardly extending planar surface, 8. A fluid seal assembly adapted to provide a seal between a pair of relatively rotatable parts comprising, an annular seal housing having a first annular recessed portion with a radially inwardly extending planar surface and a second annular recessed portion spaced from said planar surface, an annular seal ring secured against rotation within said first housing annular recessed portion and having
- a cylindrical body portion having a cylindrical external surface,
- an annular lip portion extending axially from one end of said cylindrical body portion, said annular seal lip portion having conically shaped external surface adjacent one end,
- a lip portion extending radially from the other end of said body portion, said seal ring radially extending lip portion positioned in non-rotatable sealing relation with said seal housing inwardly extending planar surface, a rigid annular support ring having a lower coefficient of thermal expansion than said annular seal ring positioned in overlying relation with said seal ring body portion cylindrical external surface, said support ring having a planar radial surface and a cylindrical inner surface for limiting thermal expansion of said seal ring body portion cylindrical external surface, an annular wedge ring positioned in overlying relation with said seal ring axially extending annular lip portion, an annular resilient member surrounding said annular wedge ring and radially urging said wedge ring against said seal ring annular lip portion to thereby urge said annular lip portion into sealing engagement with a cylindrical shaft extending therethrough, an annular split ring positioned in said second housing annular recessed portion, and annular resilient means positioned between said wedge ring and said annular support ring to urge said seal ring radially extending lip portion against said housing radially extending planar surface to thereby maintain said seal ring radially extending lip portion in non-rotatable sealing engagement with said housing planar surface upon radial eccentricity of said shaft relative to said seal housing.

9. In a fluid seal assembly as set forth in claim 8 in which said annular seal ring cylindrical body portion includes an outwardly extending shoulder portion between said body portion cylindrical surface and said radially extending lip portion,
- said rigid annular support ring positioned in overlying relation with said seal ring body portion cylindrical external surface and abutting said annular shoulder portion.

References Cited by the Examiner

UNITED STATES PATENTS 2,998,987  9/1961  Taschenberg et al. ____ 277—144

FOREIGN PATENTS 54,058  1/1947  France.
1,140,046  2/1957  France.

LAVERNE D. GEIGER, *Primary Examiner.*

J. S. MEDNICK, *Assistant Examiner.*